Nov. 7, 1950 W. H. GREEN 2,528,879
CLARIFYING APPARATUS
Filed July 27, 1946 2 Sheets-Sheet 1

INVENTOR.
Walter H. Green
BY
Atty.

Nov. 7, 1950   W. H. GREEN   2,528,879
CLARIFYING APPARATUS
Filed July 27, 1946   2 Sheets-Sheet 2
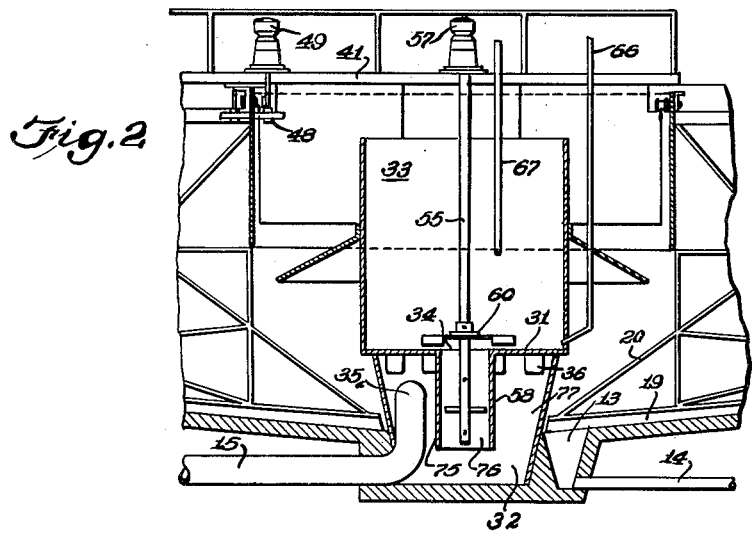
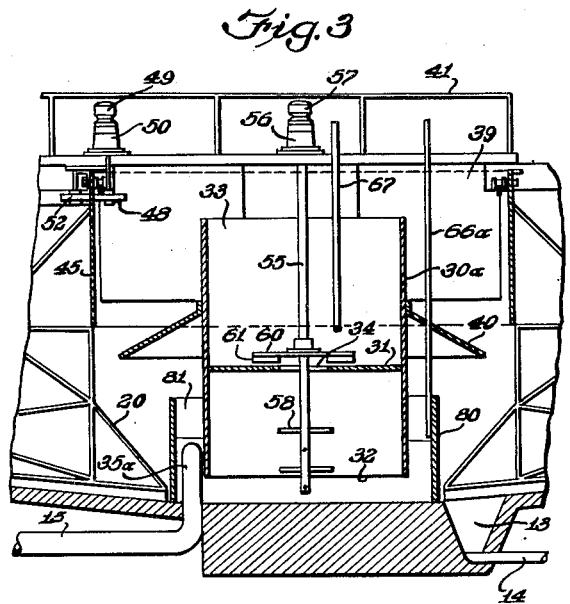
INVENTOR.
Walter H. Green
BY Robyn Wilcox
Att'y.

Patented Nov. 7, 1950

2,528,879

UNITED STATES PATENT OFFICE 2,528,879

CLARIFYING APPARATUS

Walter H. Green, Batavia, Ill., assignor to Infilco Incorporated, Chicago, Ill., a corporation of Delaware Application July 27, 1946, Serial No. 686,654

15 Claims. (Cl. 210—16)

This invention relates to an apparatus for separating solids from liquid.

One of the objects of my invention is to provide an improved clarifying apparatus.

Another object of this invention is to provide an improved apparatus suitable for flocculating flocculatable solids in a liquid and their ready separation from the liquid in which contained.

A still further object of this invention is to provide a more efficient utilization of the space of a clarification basin.

A still further object of this invention is to provide an improved clarification apparatus for use in the process described in my copending application, Serial No. 463,433, now Patent No. 2,429,316, particularly adapted for use in separating fragile and light solids from liquid such as the sewage solids from sewage or cellulosic material from paper machine white water, and the like.

These and other objects of my invention will be apparent from the description and claims which follow.

The art of clarifying liquids, and apparatus which are used therefor, are well known and neither need be described in detail. Commonly, modern clarification apparatus utilizes a circular tank with the introduction of liquid to be clarified into a center inlet well, and the removal of clarified effluent from a peripheral launder. A very desirable feature of such an apparatus is the fact that as the liquid flows from the center to the periphery of the basin the velocity of flow is substantially diminished. It is a well known fact that the velocity of a flow of liquid is directly proportional to the ratio between the volume of flow and the area through which the flow passes. As the cross-sectional area through which the flow passes in a circular tank increases as the square of the radius, it follows that the velocity must decrease considerably as the flow approaches the periphery of the basin. Under such conditions, obviously, there will be little deposit of lighter solids at the center. Thus the center portion of the clarification basin is customarily not particularly useful for sedimentation processes when a light solid is involved, and primarily for this reason various structures have been proposed which utilize the center portion for other purposes, such as flocculation of solids in the liquid to be clarified. My invention relates to an improved structure of this latter type and provides an improved utilization of the space in the tank. My invention also supplies a means for adapting the clarifiers of the prior art for a practice of the slurry processes, such as described by the patents to Spaulding, No. 2,021,672, and Hughes, No. 2,245,587.

The invention will be more readily understood from reference to the drawings in which:

Figures 2 and 3 are partial, vertical cross-sectional views of two other embodiments of the central pier, or mixing chamber, of my invention.

Figure 1:
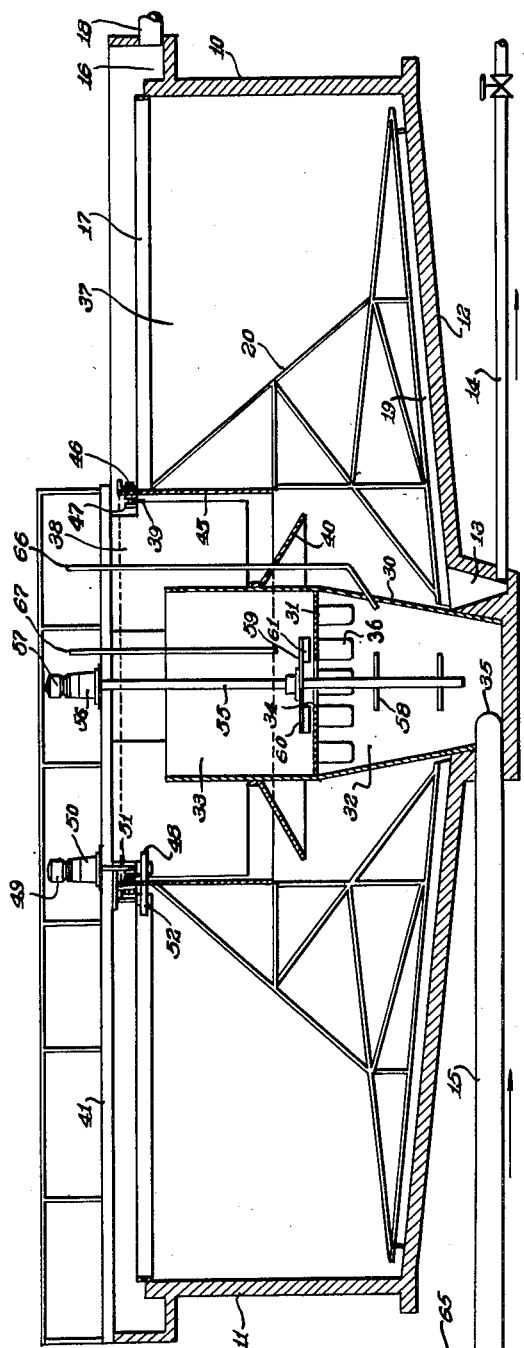
Figure 1 represents a vertical cross-sectional view of one embodiment of the apparatus of my invention.

My invention utilizes a clarification basin of customary design, although it can be considerably smaller than heretofore thought permissible for such structures. Ordinarily such basins 10 are circular and confined within a vertical wall 11. The basin is also provided with a floor 12 which customarily slopes to a solids collection sump 13, generally located adjacent the center of the basin. A valved solids withdrawal line 14 leads from the sludge sump 13 to a point of disposal. Liquid to be treated is introduced into the vessel 10 through a liquid inlet line 15 which discharges into an inlet chamber in the center of the tank. Clarified liquid overflows into a peripheral launder 16 around the upper portion of the wall 11, customarily being withdrawn over a weir 17 into the launder 16, and thence through clarified liquid outlet 18 to disposal. In such a structure the solids depositing on the floor of the tank are scraped to the sump 13 by a suitable sludge scraper mechanism which includes scraper blades 19 supported and moved by a suitable truss 20. The blades and truss assembly may take a variety of forms and be suspended and operated in a variety of ways. The sludge scraper assembly of my invention is somewhat different from that heretofore used or suggested and will be described in detail hereafter.

In my invention the inlet conduit 15 discharges into a central chamber which combines the function of a center pier and a mixing and reaction chamber. This pier, or chamber, which, for convenience, we may call the mixing and reaction chamber, is formed by a substantially vertical wall 30 rising from the floor of the tank to preferably a short distance below the level of the weir 17. The mixing and reaction chamber is preferably but not necessarily divided by a substantially horizontal partition 31 into a lower chamber 32 and an upper chamber 33. A central opening 34 in the horizontal partition 31 affords communication from lower chamber 32 into upper chamber 33. Preferably the inlet conduit 15 discharges into the lower portion of the lower chamber 32, and preferably may discharge tangentially to the chamber wall at the floor of the chamber, as shown at 35. The lower chamber 32 is provided with a plurality of ports 36, in the wall of the pier 30 thus providing commnication between the lower chamber 32 and the annular, or sedimentation, portion 37 of the tank. It will be understood that the pier structure is larger than is customary for it is designed to serve the dual purpose of a supporting structure and a mixing zone of sufficient size to give proper retention for the prolonged mixing required in the slurry process.

A plurality of vertical, radial baffles 38 extend outwardly some distance from the upper portion of the pier wall. Preferably the baffles 38 extend from the level of the top of the tank down a considerable distance below the liquid level as shown. These baffles serve the three-fold purpose of stilling rotation in liquid discharging over the upper edge of the pier wall, supporting the bridge which extends from the tank periphery to the pier, and supporting the s'udge raking mechanism. A circular rail 39 is mounted on the upper peripheral portions of the baffles 38. On the outside of the pier wall 30 is placed a baffle 40, which may be horizontal, but which preferably is sloped downwardly and outwardly as shown. This baffle 40 can be located at any level of the basin 10, intermediate the lower edge of the outer draft tube 45 hereafter described and the top of the ports 36.

As shown in the drawings and indicated above, a bridge 41 extends from the periphery of the tank 10 to the central portion of the basin, being supported at one end by the tank wall 11 and at the other by the vertical baffles 38. The bridge 41 may be of any suitable well known construction and is utilized to provide access to the operating mechanism of the tank and to support the driving motors for the various parts of the equipment.

A rotatable cylindrical draft tube 45 surrounds the upper portion of the pier, and preferably is located immediately adjacent the peripheral edges of the baffles 38. This draft tube is supported by the rail 39, being rotatably mounted thereon by any suitable means. For illustration I show shafts 46 mounted adjacent the upper edge of the draft tube 45 (obviously a plurality of such shafts being necessary) and on each shaft is mounted a wheel 47 which engages the track 39. The sludge scraper truss 20 is suspended from the outer draft tube 45 by any acceptable truss means as shown.

The who'e assembly of outer draft tube 45 and truss 20 is rotated by any suitable driving means, for example, by means of rubber tired wheel 48 which engages the draft tube 45 and which is driven by means of motor 49, operating through gear reducer 50 and shaft 51. Opposing the thrust of the drive wheel 48 is an idler wheel 52 supported by any proper means, such as from the bridge 41. Preferably the two wheels 48 and 52 will be connected by a suitable toggle arrangement of known construction by means of which the wheels are pressed together upon rotation of either of them.

The mixing chambers 32 and 33 enclosed in the pier wall 30 are provided with a suitable agitating and pumping mechanism. Preferably the pumping and agitating mechanism is mounted on a vertical shaft 55 which is supported from thrust bearings in gear reducer 56 which in turn is driven by motor 57. Ordinarily, it will be preferred to have the shaft 55 extend downwardly to a lower portion of the lower chamber 32. In that event a plurality of agitating bars 58 (which preferably are short enough to pass through the passageway 34 in the horizontal partition 31) will be mounted on the shaft 55, in the lower chamber 32. In some instances hydraulic mixing (from the jet effect of the tangential discharge 35) will be sufficient for the primary mixing, in which event it will be understood that the agitators 58 can be omitted from the lower chamber 32. Also mounted on the shaft 55, just above the passageway 34 is a rotor member or pump 59. Preferably the rotor 59 comprises a plate 60 keyed to the shaft 55 in any suitable manner, to the underside of which is secured a plurality of vertical blades 61. Rotation of the shaft 55 causes blades 61 to act as a centrifugal pump drawing liquid from the lower chamber 32 and discharging it outwardly adjacent the floor of the upper chamber 33, which causes it to flow over the upper wall of the upper chamber into the space between the pier wall 30 and the outer draft tube 45. It will be obvious that any other type of liquid moving, or pumping, member can be used in place of the rotor 60, such as, for example, a propeller, or the like.

In operation the liquid to be treated flows into the lower portion of the lower chamber 32, preferably being given a swirling motion by the tangential discharge 35. This liquid may be dosed with suitable chemicals as through chemical feed pipe 65 discharging into the inlet conduit 15, or chemical feed pipe 66 discharging into the lower chamber 32, or chemical feed pipe 67 discharging into the upper chamber 33—the chemical being fed at different parts of the apparatus depending upon the nature of the coagulant and the nature of the water to be treated. In some instances, as in "self-coagulation," no chemicals are necessary, and then it is possible to dispense with the chemical feed lines. The liquid entering the lower chamber 32 is agitated by rotation of the shaft and agitating bars 58 so that any chemical therein is thoroughly mixed with the liquid undergoing treatment. Also entering the lower mixing chamber will be a considerable quantity of liquid containing solids from the outer or clarifying portion 37 of the tank, which enters the lower chamber 32 through ports 36. In a structure of this type, it ordinarily will be desirable that the pump, or rotor 59, pump an amount of liquid considerably in excess of the inflow of liquid to be treated, whereby a large amount of material from the outer portion 37 of the tank, which constitutes the clarifying basin, is returned to the lower chamber 32. This returned liquid will contain heavily concentrated solids which are depositing in the outer clarification basin 37 but which have not yet been deposited on any surface and thus come to a state of rest. There are definite advantages in returning what might be called "partially thickened solids," or "settling solids" (as distinguished from settled solids), as pointed out in my said copending application.

The mixture of returned solids and entering liquid is then pumped into the upper chamber, flows over the wall thereof and downwardly in the space between the pier 30 and the outer draft tube 45, and is then directed outwardly by baffle 40. It is a well known fact that solids settling from a liquid in a clarification basin form gradually merging zones which range from settled sludge on the floor of the tank to a heavy slurry immediately thereabove, a lighter slurry at an intermediate level, and eventually clarified liquid at the top. It is also well known that these solids tend to level off clear across the tank so that these zones are horizontal to a large extent throughout the whole area of the tank. Thus the liquid-solids mixture issuing from the upper draft tube tends to spread horizontally across the entire area of the basin 10. As solids settle from this mixture they form a liquid-solids mixture of downwardly increasing density. However, at any level the mixture is substantially uniform across the whole area of the tank. Ordinarily, a large amount of this liquid-solids mixture is taken from an intermediate level thereof and returned through ports 36 to the lower mixing chamber 32 for admixture with the incoming water and chemical, if a chemical is used. Thus precipitation or coagulation occurring in the incoming liquid takes place in and with the partially thickened solids returned from the outer portion of the basin, thereby developing larger and denser particles than was possible in the customary flocculation or coagulation process.

The sludge scraping mechanism is rotated slowly to push the solids into the sludge sump 13 by the motor 49, the drive wheel 48, and the outer draft tube 45 above described.

Figure 2 shows a slight modification of the embodiment shown in Figure 1. The structure is the same as in Figure 1 except that a cylindrical tube or partition 75 depends from the horizontal partition 31. Preferably this cylindrical partition will be of a diameter substantially that of the passageway 34 and extends downwardly to a level a short distance above the floor 12. This structure divides the lower chamber 32 into an inner space 76 and outer space 77—the outer space serving as a conduit or passageway for taking a liquid-solids mixture from a central elevation of the clarification chamber 37 to the lower part of the lower chamber 32. The outer space 77 also can serve as a preliminary mixing and agitation chamber especially if, as shown in the figure, the inlet pipe discharges tangentially therein, as shown at 35a. Mixing in the outer chamber 77 will be such as is secured from the force of the discharge of liquid to be treated. However, in the inner space 76 the mixture can be subjected to a mechanical mixing and agitation.

For some types of liquids the embodiment shown in Figure 2 is preferable as it provides for a more definite and prolonged mixing and agitation of liquid, settling solids and reagent. Also, there is less possibility of short circuiting in the structure of this figure than that of Figure 1. It might also be mentioned that the ports 36 in this figure are lower than in Figure 1. It will be understood that the elevation of the ports is a matter of selection, depending on the liquid to be treated and the type of treatment applied thereto. In all instances however the ports will be a substantial distance above the floor of the tank as in this process settled solids are not returned to the mixing zone, but only settling solids of a predetermined density. Thus the elevation of the ports will depend on the thickness of the solids it is desired to return to the mixing zone.

Figure 3 illustrates in a partial vertical cross-sectional view another embodiment of the apparatus of my invention. In this form a short cylindrical partition 80 rises from the floor of the tank to a central elevation therein. This partition is of greater diameter than the pier member 30a and surrounds it in the lower portion of the tank. In this embodiment the pier member 30a terminates at a level a short distance above the floor and is supported by any suitable means, such as legs, not shown, or the plate members 81 which support the inner cylindrical partition 30a from the outer and shorter partition 80. The chemical feed line 66a preferably will discharge into the space between the two cylindrical partitions 80 and 30a so that the chemical reagent can be mixed with the liquid solids mixture before coming in contact with the water to be treated. As was shown in the embodiment illustrated by Figure 2 this form also provides for mixing returned solids, chemical reagent, and liquid to be treated in the outer space and thereby provides for better reaction conditions in some types of liquid. This form will sometimes be preferred over that of Figure 2 as it provides a larger secondary mixing chamber (the space within the inner cylinder, or pier, 30a) as well as a preliminary mixing of liquid, reagent and settling solids and also provides for a better selection of solids than do the structures utilizing plain ports.

It will be obvious from the above description of my apparatus and the process carried on therein that the structure can take a variety of forms and be of various sizes and shapes. It will, therefore, be understood that my invention is not to be strictly limited to the exact forms shown and described.

I claim:

1. Liquid treating apparatus comprising a basin having a floor, an annular partition structure rising from the floor of said basin at the center thereof, a horizontal partition at an intermediate elevation within said partition structure substantially above the floor thereof dividing said annular partition structure into lower and upper chambers and providing a restricted passageway from said lower to said upper chamber, ports through the said partition structure below the level of said horizontal partition and a substantial distance above the floor of the basin, a pumping member associated with said passageway and adapted on operation thereof to cause a flow from said lower chamber into said upper chamber in excess of the flow of liquid to be treated and motor driven means for driving said pumping member, vertical baffles extending from the outside of the upper portion of said partition structure, a draft tube rotatably mounted on said baffles, a solids collecting chamber in the floor of said basin, a sludge scraping mechanism suspended from said draft tube, motor driven means for rotating said draft tube and scraping mechanism to impel solids settling on the floor of said basin to said solids collecting chamber, an inlet positioned to discharge liquid to be treated into said lower chamber, a solids outlet from said solids collecting chamber, and a launder adjacent to the top of said basin.

2. Liquid treating apparatus comprising a basin having a floor and side wall, an overflow adjacent the top of said side wall, an annular partition structure rising from the floor of said basin, a bridge structure extending from the wall of said basin and supported at its inner end by said annular partition structure, an outer draft tube surrounding the upper portion of said annular partition structure and extending from above the level of said overflow down to an intermediate elevation in said basin, a solids sump in the floor of said basin, a rotatable scraping mechanism adapted on rotation thereof to impel solids into said solids sump, motor driven means for rotatably driving said scraping mechanism, an outlet from said solids sump, a horizontal partition within said annular partition structure at a central elevation thereof dividing the space enclosed by said annular partition structure into an upper and a lower chamber, said horizontal partition being so constructed and arranged as to provide a passageway between the lower and upper chambers, an inlet for liquid to be treated discharging into the lower chamber, ports through said annular partition structure into an upper level of the lower chamber and below the level of the lower end of said draft tube, a deflecting baffle extending outwardly from said annular partition structure intermediate the lower end of said draft tube and said ports, a vertical shaft extending through said passageway, agitators mounted on said shaft below the level of said horizontal partition, a pumping member adjacent said passageway mounted on said shaft, motor driven means for rotating said shaft, and means for delivering a chemical treating reagent to the liquid to be treated.

3. Liquid treating apparatus comprising a basin having a floor, an overflow adjacent the top of said basin, a hollow pier structure rising from the central portion of the floor of said basin and forming a central mixing chamber, a pumping member in said mixing chamber and so constructed and arranged as to pump liquid upwardly from a lower level thereof and over the top of said mixing chamber, motor driven means for operating said pumping member, an inlet leading from a central level intermediate said floor and said overflow into said mixing chamber, a draft tube surrounding the upper portion of said pier structure and extending downwardly from a level disposed above said overflow to a level above said inlet, a deflecting baffle intermediate said inlet and the lower end of said draft tube, a sludge scraping mechanism mounted for movement over said floor, motor driven means for operating said sludge scraping mechanism, a sludge outlet from the floor of said basin, a bridge extending from the wall of said basin to said pier structure, and an inlet for liquid to be treated discharging into the lower portion of said mixing chamber.

4. Liquid treating apparatus comprising a basin having a floor, an overflow launder adjacent the top of said basin, a cylindrical partition structure rising from said floor to an intermediate level in said basin, a second cylindrical partition inside the space enclosed by said first partition and so constructed and arranged with respect to said first partition as to form therewith an annular channel leading from said basin into the space enclosed by said second partition, means supporting said second partition above the floor of said basin, said second partition terminating adjacent the level of said launder, an inlet for liquid to be treated discharging within said first mentioned partition structure, a horizontal partition at a central elevation within said second cylindrical partition forming therein an upper and a lower chamber, said horizontal partition having an apertured portion providing a passageway from said lower to said upper chamber, a pumping member associated with said passageway and adapted on operation thereof to cause a flow from said lower chamber into said upper chamber in excess of the rated flow of liquid to be treated, an agitating means in the lower chamber, vertical baffles extending outwardly from the upper portion of said second cylindrical partition, a draft tube mounted on said vertical baffles and extending from above the normal liquid level in said basin downwardly to a level above said channel, a deflecting baffle on said second cylindrical partition intermediate the upper end of said first partition structure and the lower end of said draft tube, a solids collecting chamber in the floor of said basin, a sludge scraping mechanism adapted to impel solids settling on the floor of said basin to said solids collecting chamber, a solids outlet from said solids collecting chamber, a bridge extending from the wall of said basin to said vertical baffles, and motor means mounted on said bridge for driving said pumping member and agitating means, and driving said scraping mechanism.

5. Liquid treating apparatus comprising a basin having a floor, a launder adjacent the top of said basin, a hollow pier structure rising from said floor to a level subjacent the level of said launder, a horizontal partition at a central elevation within said pier structure dividing said pier structure into upper and lower sections and having an open portion providing a passageway from said lower to said upper section of said pier structure, an inlet into said lower section, an inner partition registering with said passageway and depending from said horizontal partition and extending down to a level a short distance above said floor, ports through the said pier structure subjacent the level of said horizontal partition, a pumping member associated with said passageway and said inner partition and adapted on operation thereof to cause a flow upwardly through said inner partition into said upper section in excess of the rated flow of liquid to be treated, an agitating means in the space enclosed by the inner partition, motor driven means for driving said pumping member and agitating means, vertically extending baffles extending outwardly from the upper portion of said pier structure, a draft tube mounted on said vertical baffles, a solids collecting chamber in the floor of said basin, a sludge scraping mechanism rotatably movable over the floor of said basin to impel solids settling on the floor of said basin to said solids collecting chamber, motor driven means for driving said scraping mechanism and a solids outlet from said solids collecting chamber.

6. Liquid treating apparatus comprising a basin having a floor and an overflow adjacent the top of said basin, a hollow pier structure rising from the central portion of the floor of said basin, a horizontal partition member in said pier structure dividing the space enclosed by said pier structure into an upper and a lower chamber, a passageway through said partition, a pumping member associated with said passageway and so constructed and arranged as to pump liquid from the lower chamber into the upper chamber, inlet means opening from an intermediate elevation of the basin into the lower chamber, a vertical draft tube surrounding the upper portion of said pier structure and extending from a level above said overflow to a level above said inlet means, a deflecting baffle extending outwardly from said pier structure intermediate the lower end of said draft tube and said inlet means, a sludge scraping mechanism rotatably movable over the floor of said basin, driving means for rotating said pumping member and for rotating said sludge scraping mechanism, and an inlet for liquid to be treated discharging into said lower chamber.

7. In a liquid treating apparatus, the combination with a clarification basin having a floor upon which the sediment from the treated liquid settles in the form of thickened sludge, a sludge outlet leading from said floor, an outlet for the clarified liquid adjacent the top of said basin, a hollow pier rising from said floor, the inner portion of which pier forms a mixing and reaction chamber, a draft tube spaced from and surrounding said pier and extending from a plane above the normal level of the liquid in said basin downwardly into said basin into the clarifying liquid therein, an inlet for admitting the liquid to be treated into the lower portion of said mixing and reaction chamber, at least one port in the wall of said pier at an intermediate elevation spaced above the floor of said basin and below the lower end of said draft tube and providing an inlet admitting partially thickened solids from various points of said basin into said mixing and reaction chamber for admixture with the incoming liquid being treated, and means adapted to cause an upward flow in said mixing and reaction chamber.

8. In a liquid treating apparatus, the combination with a clarification basin having a floor upon which the sediment from the treated liquid settles in the form of thickened sludge, a sludge outlet leading from said floor, an outlet for the clarified liquid adjacent the top of said basin, a hollow pier rising from said floor, the inner portion of which pier forms a mixing and reaction chamber, a draft tube spaced from and surrounding said pier and extending from a plane above the normal level of the liquid in said basin downwardly into said basin for discharging the treated liquid into said basin beneath the level of the clarified liquid therein, an inlet for admitting the liquid to be treated into the lower portion of said mixing and reaction chamber, a port in the wall of said pier at an intermediate elevation spaced above the floor of said basin and below the discharge end of said draft tube and providing an inlet leading from the basin into the mixing and reaction chamber for returning partially settled solids thereto, and a pumping member in said mixing and reaction chamber.

9. In a liquid treating apparatus, the combination with a clarification basin having a floor upon which the sediment from the treated liquid settles in the form of sludge, a sludge outlet leading from said floor, an outlet for the clarified liquid adjacent the top of said basin, a hollow pier rising from said floor, the inner portion of which pier forms a mixing and reaction chamber, a draft tube spaced from and surrounding said pier and extending from a plane above the level of the liquid in said basin downwardly into the clarifying liquid in said basin, an inlet for admitting the liquid to be treated into the lower portion of said mixing and reaction chamber, inlets leading into said mixing and reaction chamber in planes spaced above the settled sludge in said basin, but below the level of discharge of the treated liquid from said draft tube, and arranged to return partially thickened solids from various points of said basin into said mixing and reaction chamber, and a pump within said chamber establishing a flow of liquid upwardly along said chamber in excess of the flow of liquid to be treated.

10. In a liquid treating apparatus, the combination with a clarification basin having a floor upon which the sediment from the treated liquid settles in the form of sludge, a sludge outlet leading from said floor, an outlet for the clarified liquid adjacent the top of said basin, a hollow pier rising from said floor, the inner portion of which pier forms a mixing and reaction chamber, a draft tube spaced from and surrounding said pier and extending from a plane above the level of said clarified liquid outlet downwardly along said pier, and with said pier forming a discharge channel for the treated liquid, arranged to discharge the treated liquid into the clarifying liquid in said basin, an inlet for admitting the liquid to be treated into the lower portion of said mixing and reaction chamber, a partition extending across said mixing and reaction chamber and dividing said mixing and reaction chamber into a lower and an upper chamber, said partition having an apertured portion forming a passageway leading from said lower to said upper chamber, a pump associated with said apertured portion of said partition and arranged to establish a flow of liquid from said lower to said upper chamber in excess of the flow of the liquid to be treated, inlets leading into said chamber in planes spaced beneath said partition and above the level of the sludge on the floor of said basin, and arranged to return partially thickened solids from various parts of said clarification basin into said mixing and reaction chamber.

11. In a liquid treating apparatus, the combination with a clarification basin having a floor upon which the sediment from the treated liquid settles in the form of thickened sludge, a sludge outlet leading from said floor, an outlet for the clarified liquid adjacent the top of said basin, a hollow pier rising from said floor, the inner portion of which pier forms a mixing and reaction chamber, an inlet for admitting the liquid to be treated into the lower portion of said mixing and reaction chamber, a partition extending across said mixing and reaction chamber and dividing said mixing and reaction chamber into a lower and an upper chamber, said partition having an apertured portion forming a passageway leading from said lower to said upper chamber, a pump associated with said apertured portion of said partition and operative to establish a flow of liquid from said lower to said upper chamber in excess of the flow of the liquid to be treated, inlets leading into said chamber in planes beneath said partition and above the level of the sludge on the floor of said basin, and arranged to return partially thickened solids from various parts of said clarification basin into said mixing and reaction chamber, and a draft tube spaced from and surrounding said pier and extending from a plane above the normal level of liquid in said basin downwardly to a level above said last mentioned inlets, and a deflector extending outwardly from said pier above said inlets and in the path of liquid discharged from said draft tube.

12. In an apparatus for treating and clarifying liquid, comprising a clarification basin having a floor, and having a lower zone of settled sludge, and a clarified liquid zone near its top, a sludge outlet leading from said floor, a hollow pier rising from said floor, the hollow inside of which forms a mixing and reaction chamber for the liquid being treated, an inlet for the liquid to be treated leading into the lower portion of said chamber, an overflow for the treated liquid adjacent the top of said basin, and a draft tube spaced from and surrounding said pier and extending from a level above the level of said overflow downwardly to an elevation beneath said clarified liquid zone but above said zone of settled sludge; the improvement including a pump within said chamber and arranged to establish a flow of liquid upwardly along said chamber in excess of the rate of flow of the liquid being treated, and a plurality of ports in said pier leading into said chamber and disposed in planes spaced vertically from said floor above said zone of settled sludge a substantial part of the distance from said floor to the lower end of said draft tube, and arranged to supply partially thickened solids to said chamber from diverse portions of said basin.

13. In an apparatus for treating and clarifying liquid, including a clarification basin having a floor, and having a lower zone of settled sludge and a clarified liquid zone near its top, a sludge outlet leading from said floor, a hollow pier rising from said floor, the hollow inside of which forms a mixing and reaction chamber, an inlet for the liquid to be treated leading into the lower portion of said chamber, an overflow for the treated liquid adjacent the top of said basin, and a draft tube spaced from and surrounding said pier and extending from a level above the level of said overflow, downwardly to a level beneath said clarified liquid zone but above said zone of settled sludge; the improvement including a horizontal partition extending across said mixing and reaction chamber and separating said mixing and reaction chamber into a lower and an upper chamber, said partition having a central apertured portion forming a passageway for the flow of liquid from said lower to said upper chamber, a pumping member associated with said apertured portion of said partition and arranged to establish a flow of liquid from said lower chamber to said upper chamber in excess of the liquid delivered through said inlet, and ports in said pier leading into said lower chamber from a level intermediate said zone of settled sludge and said clarified liquid zone and arranged to supply partially thickened solids to said lower chamber from diverse portions of said basin.

14. In an apparatus for treating and clarifying liquid, comprising a clarification basin having a floor, and having a lower zone of settled sludge and a clarified liquid zone near its top, a sludge outlet leading from said floor, a hollow pier rising from said floor, the hollow inside of which forms a mixing and reaction chamber for the liquid being treated, an inlet for the liquid to be treated leading into the lower portion of said chamber, and an overflow for the treated liquid adjacent the top of said basin; the improvement including a horizontal partition extending across said mixing and reaction chamber and separating said chamber into a lower and an upper chamber, said partition having a central apertured portion forming a passageway for the flow of liquid from said lower to said upper chamber, a pumping member associated with said apertured portion of said partition and arranged to establish a flow of liquid from said lower to said upper chamber in excess of the liquid delivered through said inlet, ports in said pier leading into said lower chamber at an elevation spaced above the zone of settled sludge and arranged to supply partially thickened solids into said lower chamber from diverse portions of said basin, a deflector extending outwardly from said pier and terminating in a plane adjacent but above said ports in said pier, and a draft tube surrounding said pier and extending from a level disposed above the level of said outlet downwardly to a level adjacent but above the outer end of said deflector.

15. Liquid treating apparatus comprising a basin having a floor, an overflow adjacent the top of said basin, a hollow pier structure rising from the central portion of the floor of said basin, a horizontal partition extending across the inside of said pier structure and dividing said pier structure into an upper and a lower chamber, a passageway through said partition, a pumping member associated with said passageway and so constructed and arranged as to pump liquid from the lower chamber into the upper chamber, motor driven means for driving said pumping member, ports in said pier structure and leading from a central elevation of the basin into the lower chamber, an outer draft tube surrounding the upper portion of said pier structure and terminating at its lower end at a level above said ports, a deflecting baffle extending outwardly from said pier structure intermediate the lower end of said draft tube and said ports, a sludge scraping mechanism movable along the floor of said basin, motor driven means for operating said scraping mechanism, and an inlet for liquid to be treated discharging into said lower chamber.

WALTER H. GREEN.

REFERENCES CITED

The following references are of record in the file of this patent:

UNITED STATES PATENTS

| Number | Name | Date |
|---|---|---|
| 2,296,437 | Green | Sept. 22, 1942 |
| 2,348,123 | Green et al. | May 2, 1944 |
| 2,382,490 | Lawlor | Aug. 14, 1945 |
| 2,391,738 | Prager | Dec. 25, 1945 |
| 2,400,598 | Prager | May 21, 1946 |
| 2,427,091 | Durdin, 3d | Sept. 9, 1947 |
| 2,427,886 | Walker | Sept. 23, 1947 |

Certificate of Correction

Patent No. 2,528,879 November 7, 1950

WALTER H. GREEN

It is hereby certified that error appears in the printed specification of the above numbered patent requiring correction as follows:

Column 3, line 5, for "commnication" read *communication*; column 7, line 53, for the word "adjacent" read *subjacent*;

and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*